United States Patent [19]

Fuzesi

[11] 4,219,624

[45] Aug. 26, 1980

[54] STABILIZATION OF AMINE CATALYSTS IN A COMPOSITION WITH HALOGENATED POLYOLS FOR USE IN POLYURETHANE FOAM PRODUCTION

[75] Inventor: Stephen Fuzesi, Hamden, Conn.

[73] Assignee: Olin Corporation, New Haven, Conn.

[21] Appl. No.: 962,537

[22] Filed: Nov. 20, 1978

Related U.S. Application Data

[63] Continuation-in-part of Ser. No. 801,676, May 31, 1977, abandoned.

[51] Int. Cl.$^2$ ............................................. C08G 41/00
[52] U.S. Cl. ...................... 521/171; 252/181; 521/109; 521/112; 521/114; 521/116; 521/131
[58] Field of Search ............... 252/182; 521/171, 109, 521/112, 114, 116, 131

[56] References Cited

U.S. PATENT DOCUMENTS

| | | | |
|---|---|---|---|
| 3,010,963 | 11/1961 | Erner | 521/171 |
| 3,372,130 | 3/1968 | Chess et al. | 521/172 |
| 3,402,169 | 9/1968 | Jackson et al. | 521/171 |
| 3,630,973 | 12/1971 | Ardis | 521/171 |
| 3,706,687 | 12/1972 | Rudzki | 521/118 |
| 3,726,855 | 4/1973 | Lapkin | 260/309 R |
| 3,728,291 | 4/1973 | Carroll et al. | 521/112 |
| 3,769,244 | 10/1973 | Hashimoto et al. | 521/171 |
| 3,980,579 | 9/1976 | Syrop et al. | 252/182 |
| 4,020,024 | 4/1977 | Walraevens et al. | 521/171 |
| 4,115,300 | 9/1978 | Chakirof | 521/171 |

*Primary Examiner*—Melvyn I. Marquis
*Attorney, Agent, or Firm*—F. A. Iskander

[57] ABSTRACT

A catalytically stabilized polyol composition is disclosed for use in the production of polyurethane foam. The composition comprises a halogenated polyol and an acid-blocked amine catalyst.

15 Claims, No Drawings

STABILIZATION OF AMINE CATALYSTS IN A COMPOSITION WITH HALOGENATED POLYOLS FOR USE IN POLYURETHANE FOAM PRODUCTION

This application is a continuation-in-part of co-pending application Ser. No 801,676, filed May 31, 1977 and now abandoned.

This invention relates to the stabilization of amines used as catalysts in a pre-mix polyol composition containing a halogenated polyol, to be used in the production of polyurethane foam.

Polyurethane foam is generally prepared by reacting an organic polyisocyanate with a polyol in the presence of a foaming agent and a reaction catalyst. Although a variety of catalysts have been disclosed in the art for promoting this type of reaction, the most widely and successfully used catalysts are the aliphatic and cycloaliphatic amines including mixtures thereof with selected metal salts such as stannous octoate. These preferred amine catalysts have an activity profile which results in favorable foam processing characteristics.

Catalyst compositions for polyurethane foam have heretofore been disclosed in the art which include salts of certain amines and acids. For example, U.S. Pat. No. 3,372,130 to Chess et al shows a catalyst consisting of a tertiary amine and phosphoric acid used to control the rate of foam rise. U.S. Pat. No. 3,706,687 to Rudzki describes a foam catalyst consisting of a mixture of an aliphatic tertiary amine and a tertiary amine salt of an alkylarylsulfonic acid. In U.S. Pat. No. 3,728,291 to Carroll et al, a triethylene diamine diformate salt is employed in combination with hydroxypropyl imidazole as a catalyst composition for polyurethane foam. None of these patents, however, are directed to a stabilized amine-catalyzed polyurethane foam composition comprising a halogenated polyol.

Polyurethanes derived from halogenated polyols exhibit varying degrees of resistance to burning; and, in view of the increasing demand for flame retardant polyurethane foam, numerous halogenated polyol compositions have been developed for use by the polyurethane industry. Illustrative of these are polyether polyols which contain two or more halogens substituted on an aliphatic carbon atom within the polyol molecule. See, for example, U.S. Pat. Nos. 3,402,169 and 3,726,855.

It is a common practice in the polyurethane foaming trade to pre-mix the polyol reactant with measured amounts of the foam reaction catalyst and various other additives to form a pre-mix formulation which can be stored for convenient later use in polyurethane foaming by blending it with a suitable organic polyisocyanate. However, here is where a distinct problem arises. It has recently been discovered that halogenated polyols, such as those referred to above, exert a detrimental effect on the catalytic stability of amine catalysts. Thus, when brought in contact with such polyols, the amines become catalytically less active, the reduction in activity bearing a direct relationship to the duration of contact. This phenomenon, the chemical nature of which is not yet fully understood, is particularly critical in those applications wherein the amine catalyst is preparatorily blended in with the halogenated polyol and the blend is stored or shipped as such for eventual use in polyurethane foam production. The loss in catalyst activity exerts a marked effect on the foaming reaction and on the properties of the resulting foam.

In accordance with the present invention, it has now been found that amine-catalyzed, halogenated polyol compositions can be stabilized against catalyst degradation during storage by using an acid-blocked amine catalyst. Accordingly, pursuant to the invention, there is provided an improved catalytic polyol composition comprising a halogenated polyol and an acid-blocked amine catalyst, which composition can be advantageously used in the production of polyurethane foam.

As used in the specification and claims herein, the term "halogenated polyol" is intended to encompass any polyol containing at least one halogen atom substituted on an aliphatic carbon atom in the polyol molecule, the halogen being chlorine, bromine, or a mixture thereof. These polyols usually have 2-8 hydroxy groups and include polyether polyols, polyester polyols and mixtures thereof. However, the polyether polyols, including mixtures of halogenated and halogen-free polyether polyols, are preferred.

The polyether polyols include the halogenated oxyalkylated polyols. These may be prepared by a method generally well known in the art wherein a polyhydroxy compound is condensed, optionally in the presence of an oxyalkylation catalyst, with a halogenated alkylene oxide or a mixture of halogenated and halogen-free alkylene oxides using random or step-wise addition. U.S. Pat. No. 3,402,169, issued Sept. 17, 1969, to D. R. Jackson, provides a detailed description of this method. The entire disclosure of this Jackson patent is incorporated herein by reference.

In preparing the halogenated polyether polyols, any polyhydroxy compound, including mixtures of such compounds and alkylene oxide condensates thereof, may be employed which contains 2-8 hydroxy groups and is suitable for reaction with an alkylene oxide to form a polyether. Thus, a wide range of polyhydroxy compounds is contemplated for use in preparing the halogenated polyether polyols. For illustration, the polyhydroxy compounds include ethylene glycol, propylene glycol, isobutylene glycol, 2,3-butanediol, 1,4-dihydroxy-2-butane, 1,4-dihydroxycyclohexane, 2-butyne-1,4-diol, 1,12-dihydroxyoctadecane, glycerine, trimethylolpropane, sorbitol, mannitol, inositol, erythritol, pentaerythritol, sucrose, dextrose, methyl glucoside, 1,4-dimethylolbenzene, glycerin, monochlorohydrin, diglycerol, methyl ether of glycerin, mixtures thereof, and condensates thereof with alkylene oxide, e.g., ethylene oxide, propylene oxide and butylene oxide.

The polyhydroxy compounds also include, as a preferred group, the carbohydrate-based materials, particularly dextrose- and sucrose-based materials. As used in the specification and claims herein, the term "dextrose-based material" means one of the following: a mixture of dextrose and water, an oxyalkylated mixture of dextrose and water, a mixture of dextrose and an aliphatic polyhydric alcohol, an oxyalkylated mixture of dextrose and an aliphatic polyhydric alcohol, a mixture of dextrose, water, and an aliphatic polyhydric alcohol, or an oxyalkylated mixture of dextrose, water and an aliphatic polyhydric alcohol. The dextrose may be anhydrous such as d-glucose or hydrous such as $\alpha$-d-glucose monohydrate. By the same token, the term "sucrose-based material" means one of the following: a mixture of sucrose and water, an oxyalkylated mixture of sucrose and water, a mixture of sucrose and an aliphatic polyhydric alcohol, an oxyalkylated mixture of sucrose and an aliphatic polyhydric alcohol, a mixture of sucrose, water, and an aliphatic polyhydric alcohol, or an oxyalkylated mixture of sucrose, water, and an aliphatic polyhydric alcohol. Illustrative aliphatic polyhydric alcohols which may be used in preparing the dextrose- and sucrose-based materials include, for example, the aliphatic diols and triols such as ethylene glycol, propylene glycol, glycerol, trimethylolpropane, mixtures thereof and the like. The dextrose-based materials, particularly mixtures of dextrose and an aliphatic diol or triol, are especially preferred for use in preparing halogenated polyether polyols which are employed in the composition of the invention.

Any suitable molar ratio of water and/or aliphatic polyhydric alcohol to dextrose or sucrose may be used in preparing the dextrose- and sucrose-based materials referred to above. It is generally preferred, however, to employ at least about 0.7, and more preferably about 0.9-4 moles each of water and/or aliphatic polyhydric alcohol per each mole of dextrose or sucrose. A more detailed description regarding the preparation of the dextrose- and sucrose-based materials is provided in U.S. Pat. No. 3,741,921, which issued to M. Lapkin on June 26, 1973. The entire disclosure of this patent is incorporated herein by reference.

In preparing the halogenated polyether polyol, any alkylene oxide, or mixture thereof, may be used which has one or more halogen atoms substituted on an aliphatic carbon atom, the halogen being chlorine, bromine or a mixture thereof, and which alkylene oxide is capable of reacting with a polyhydroxy compound to form a polyether polyol. If desired, a mixture of a halogen-substituted and a halogen-free alkylene oxide may be used. The halogen-substituted alkylene oxides usually contain an epoxide ring and have from 2-4 carbon atoms. Preferred among them are the vicinal epoxides, particularly those having 3-4 carbon atoms. Representatives of these include epichlorohydrin, 3,3-dichloro-1,2-epoxypropane; 3,3-dibromo-1,2-epoxypropane; 3,3,3-trichloro-1,2-epoxypropane; 4,4,4-trichloro-1,2-epoxybutane; 4,4,4-tribromo-1,2-epoxybutane; 4,4,4,3,3-pentachloro-1,2-epoxybutane; 1,1,1,4,4-pentachloro-2,3-epoxybutane; and mixtures thereof. The preferred such halogenated alkylene oxides are those having 3 halogens in the molecule, the halogen being chlorine, such as 4,4,4-trichloro-1,2-epoxybutane.

Any suitable oxyalkylation catalyst may be employed to promote the reaction of the polyhydroxy compound with the halogenated alkylene oxide. This includes basic catalysts, such as sodium hydroxide and potassium hydroxide, and acid catalysts, such as boron trifluoride and the etherate derivatives thereof. The latter catalysts are preferably employed in preparing polyether polyols which are derived from carbohydrate-based polyhydroxy compounds.

As is well known in the art, the relative proportion of alkylene oxide, or mixture of alkylene oxides, which is used depends on the hydroxyl number which is desired in the polyether polyol product. In accordance with the preferred embodiments of the invention, a sufficient proportion of halogenated alkylene oxide or mixture thereof is employed to yield a halogenated polyether polyol having a hydroxyl number of about 100-800, more preferably about 200-700, and still more preferably about 250-650. It is also preferred to employ such a proportion of halogenated alkylene oxide as to yield a halogen content in the polyether polyol of no less than about 15%, more preferably about 20-80%, and still more preferably about 25-60% by weight.

The amine catalyst which is stabilized according to the invention can be any amine that acts as a promoter for the reaction of an organic polyisocyanate with a polyol to form a polyurethane. However, the preferred amine catalysts are the conventional alkyl tertiary amines. As used in the specification and claims herein, the term "alkyl tertiary amine" is intended to include any such amines, and mixtures thereof, including mono- and diamines. Illustrative are alkyl tertiary mono- and diamines, cycloalkyl tertiary amines and tertiary aminoalkanols. All of these tertiary amines usually contain 3-10, and preferably 4-8, carbon atoms.

Exemplificative of the alkyl tertiary amines are the trialkylmonoamines such as trimethylamine and triethylamine, the trialkylene diamines such as triethylene diamine, the N,N,N',N'-tetraalkylalkylene diamines such as N,N,N',N'-tetramethylbutane diamine. The cycloalkyl tertiary amines are exemplified by the dialkylcyclohexylamines such as dimethylcyclohexylamine and diethylcyclohexylamine; and the tertiary aminoalkanols are exemplified by the dialkyl alkanolamines, such as dimethylethanolamine and dimethylpropanolamine, the alkyl dialkanolamines such as methyldiethanolamine and methyldipropanolamine, and the trialkanolamines such as trimethanolamine, triethanolamine, diethanolpropanolamine, and tripropanolamine.

The most preferred tertiary amine catalysts for use in the composition of the invention are triethylene diamine, dimethylcyclohexylamine, N,N,N',N'-tetramethylbutane diamine, triethanolamine, dimethylethanolamine, and mixtures thereof. Particularly preferred is a mixture of dimethylcyclohexylamine and dimethylethanolamine.

Any suitable proportion of the amine which is effective in catalyzing the reaction of the halogenated polyol with organic isocyanates may be employed in the composition of the invention. Thus, catalytic proportions are usually used such about 0.02-5, preferably about 0.05-3, and more preferably about 0.075-2 parts per every 100 parts by weight of the halogenated polyol.

Pursuant to the invention, a blocking acid is used to stabilize the amine catalyst from gradual deactivation through inter-reaction with halogenated polyols. Any suitable acid capable of forming a stable salt with the amine catalyst may be used as the blocking acid. Relatively weak carboxylic acids are preferred, including aliphatic acids such as formic, acetic, propionic, butyric, or valeric acids, or aromatic acids such as benzoic acids. Formic acid is particularly preferred.

The amine is blocked through reaction with the acid to form a salt. As shown below in Equation A, using the preferred formic acid blocking agent and a dimethylcyclohexylamine catalyst for purposes of illustration, the tertiary amine reacts with the acid to form a salt, dimethylaminohexylformate, thereby blocking the amine from reacting with or being degraded by a halogenated polyol.

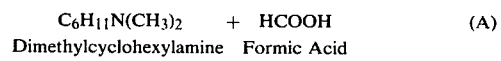
C$_6$H$_{11}$N(CH$_3$)$_2$ + HCOOH  (A)
Dimethylcyclohexylamine Formic Acid

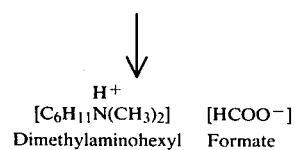
H+
[C$_6$H$_{11}$N(CH$_3$)$_2$] [HCOO−]
Dimethylaminohexyl Formate

The blocking reaction can be accomplished by mixing the amine catalyst with the acid prior to its incorporation into a polyurethane foam premix. Preferably, though, the blocking conveniently can be performed "in-situ" by blending the acid blocking agent into the halogenated polyol premix composition prior to or concurrently with the addition of the amine catalyst, as the premix is being formulated. Advantageously, ambient temperature conditions can be used, although the blocking reaction generally can be performed at a wide range of temperatures, e.g., from about $-20°$ to about $100°$ C.

In order to effectively block the amine catalyst, at least about a stoichiometric amount or an excess of stoichiometric amount of acid is used, in relation to the amount of amine catalyst. Accordingly, about 1 mole to about 2 moles of acid per mole of amine catalyst generally is used, with a preferred ratio being about 1:1 to about 1.5:1.

The catalyzed halogenated polyol composition described herein is utilized, according to the process of the invention, in the preparation of polyurethane foam. To this end, it is reacted with an organic polyisocyanate in the presence of a foaming agent. Conventional techniques, such as the one-shot method or the prepolymer technique, are employed in carrying out the foam-forming reaction. Any combination of polyol, organic isocyanate, foaming agent, catalyst, plasticizer, and other reactants capable of forming a polyurethane foam reaction mixture can be employed.

The organic polyisocyanates used in the polyurethane foams of this invention include toluene diisocyanate, such as the 80:20 or the 65:35 isomer mixture of the 2,4-and 2,6-isomeric forms, ethylene diisocyanate, propylene diisocyanate, methylenebis-(4-phenyl isocyanate), 3,3'-bitoluene-4,4-diisocyanate, hexamethylene diisocyanate, naphthalene 1,5-diisocyanate, the polymeric isocyanates such as polyphenylene polymethylene isocyanate, and the like, and mixtures thereof. The amount of isocyanate employed in the present process should generally be sufficient to provide at least about 0.7 NCO group per hydroxy group in the reaction system, which includes the polyols, as well as any additional material and/or foaming agent present. In practice, polyisocyanate is usually used in a proportion to provide no more than about 1.25 NCO groups per each hydroxy group. A 100 multiple of the ratio of NCO to OH groups in the reaction system is referred to as the "index".

Any suitable foaming agent or mixture of foaming agents may be employed. These include inorganic foaming agents, such as water, and organic foaming agents containing up to 7 carbon atoms such as the halogenated hydrocarbons, and the low molecular weight alkanes, alkenes, and ethers. Illustrative organic agents include monofluorotrichloromethane, dichlorofluoromethane, dichlorodifluoromethane, 1,1,2-trichloro-1,2,2-trifluoroethane, methylene chloride, chloroform, carbon tetrachloride, methane, ethane, ethylene, propylene, hexane, ethyl ether diisopropyl ether, mixtures thereof and the like. Water and low molecular weight polyhalogenated alkanes, such as monofluorotrichloromethane and dichlorodifluoromethane, are preferred. The amount of foaming can be varied over a wide range. Generally, however, the halogenated hydrocarbons are employed in an amount ranging from about 1 to about 75 parts by weight per 100 parts of total polyols in the foam-forming reaction system; and generally water is employed in an amount ranging from about 0.1 to about 10 parts by weight per 100 parts of total polyols.

It is preferred in the preparation of the polyurethane foams of the invention to employ minor amounts of a conventional surfactant in order to further improve the cell structure of the polyurethane foam. Typical of such surfactants are the silicone oils and soaps, and the siloxane-oxyalkylene block copolymers. U.S. Pat. No. 2,834,748 and T. H. Ferrigno, *Rigid Plastic Foams* (New York: Reinhold Publishing Corp., 1963), pp. 34–42, disclose various surfactants which are useful for this purpose. A preferred group of surfactants are the polysiloxanes such as may be purchased under the trademark "Niax L-5303". Generally up to 2 parts by weight of the surfactant are employed per 100 parts of total polyol.

To minimize surface friability of the resulting polyurethane foams, it is often desirable to incorporate a supplemental polyol into the foam-forming reaction mixture. These agents are understood to accomplish this reduced friability by serving to accelerate cure and reduce viscosity of the foam reaction mass. The various polyols effective in this additive role and their methods of use are known in the art and are exemplified by the descriptions in U.S. Pat. Nos. 3,928,257 to Fuzesi et al, and 3,928,258 to Alexander. The entire disclosures of these patents are incorporated herein by reference. Illustratively, the supplemental polyols include a select group of ethoxylated polyether polyols.

Any suitable proportion of the supplemental polyol may be employed which is effective in reducing the friability of the resulting foam without otherwise interfering with, or detrimentally altering, its properties. A proportion usually is used which ranges from about 5 to about 35, preferably about 8 to about 30 parts per every 100 parts by weight of the main polyol reactant. The requisite proportion of the supplemental polyol advantageously can be blended in with the amine polyol reactant or it may be added separately to the foam-forming reaction mixture.

Various other additives may also be incorporated in the polyurethane foam-forming reaction mixture, if desired, such as fillers, dyes, plasticizers, deodorants, and antioxidants.

The invention disclosed herein provides an easy and simple route for minimizing the problem of catalyst deactivation resulting from contact with a halogenated polyol. Thus, a halogenated polyol composition is prepared, for use in the production of flame retardant polyurethane foam, which comprises an amine catalyst, the activity of which catalyst is not subject to substantial deterioration upon storage or duirng transport. Such a composition is of particular utility in those applications, e.g., the on-site generation of polyurethane foam, wherein the foam-forming ingredients are supplied from two containers, one container providing the organic isocyanate alone or together with a portion of the foaming agent reactant and other container providing all the other reactants, e.g., polyol along with the amine catalyst, all or a portion of the foaming agent, surfactant and supplemental polyol. Typical foaming apparatus used in practicing on-site generation of polyurethane foam is described in detail in U.S. Pat. Nos. 3,769,232 and 3,541,021; both of these patent disclosures are incorporated herein by reference.

The following examples are provided to illustrate the invention. In these examples, all parts and percentages are by weight unless otherwise specified.

EXAMPLES

A series of amine-catalyzed, halogenated polyol compositions was prepared by adding blocked and unblocked amine catalysts to a halogenated polyol. The various samples were analyzed for pH, ionic Cl⁻, and available N+, before and after aging at 60° C. for 90 hours. A drop in pH with time is an indication of the dehydrohalogenation effect on the halogenated polyol by the amine catalyst. The change in ionic Cl⁻ present (determined by titration) in the composition after aging evidences the amount of Cl⁻ drawn from the halogenated polyol into salt formation with an amine group of the catalyst. The available N+ consumed is a further interpretation of the deactivating reaction of the amine catalyst and the halogenated polyol. The results of these analyses, summarized in Tables I and II, clearly indicate that by acid blocking the amine catalyst, according to the invention, the critical factor of loss in reactivity of the amine catalyst in a foaming reaction due to deactivation through storage, pre-reaction with the halogenated polyol is effectively minimized.

In the processing runs, shown in Table III, the indicated proportions of the Side I and II ingredients were mixed together and foamed in a square cardboard box. Using a stop-watch, the processing times—the "cream time", the "gel time", the "tack-free time", and the "rise time" were measured; time measurements were made from the moment the mixture was placed in the cardboard box. The "cream time" is the time elapsed up to the point when foaming commences, during which time the mixture is transformed from a liquid to a cream or emulsion. The "gel time" is the time elapsed for the resulting foam to become self-supporting as evidenced by the foam exhibiting resistance to being penetrated by a dull instrument. The "tack-free time" is the minimum time elapsed after which the foam ceases to be tacky. The "rise time" is the time elapsed for completion of the foaming reaction or expansion of the foam.

AMINE CATALYST STABILITY IN HALOGENATED POLYOL COMPOSITIONS

TABLE I

| Catalyst Used in Composition[1] | pH Before Aging | pH After Aging[2] | Ionic Cl⁻ Total After Aging[2] % | ΔCl⁻[3] | Available N+ Consumed % |
|---|---|---|---|---|---|
| Triethylene diamine | 8.97 | 5.65 | 0.39 | 0.30 | 71 |
| Dimethylethanolamine | 9.87 | 8.39 | 0.76 | 0.67 | 87 |
| Tetramethylbutanediamine | 9.97 | 8.07 | 0.80 | 0.71 | 72 |
| Dimethylcyclohexylamine | 9.84 | 8.14 | 0.53 | 0.44 | 79 |
| Triethylamine | 10.51 | 7.98 | 0.83 | 0.74 | 105 |
| Triethylenediamine monoformate | 5.49 | 5.22 | 0.21 | 0.12 | 7 |
| Triethylenediamine diformate | 4.85 | 4.76 | 0.17 | 0.08 | 10 |
| None | 4.31 | 3.37 | 0.12 | 0.03 | — |
| None | 4.19 | 3.49 | 0.10 | 0.01 | — |
| None | 4.32 | — | 0.09 | — | — |
| None | 4.20 | — | 0.09 | — | — |

[1]This is a composition of a chlorinated polyether polyol having a hydroxyl number of about 365, prepared by condensing, in the presence of boron trifluoride etherate, 4,4,4-trichloro-1,2-epoxybutane with an equimolar mixture of ethylene glycol and α-d-glucose monohydrate, and 2.01 wt. % catalyst.
[2]Aged at 60° C. for 90 hours.
[3]ΔCl⁻ = Total Cl⁻ after aging - initial Cl⁻ in unaged polyol alone.

TABLE II

| Catalyst Used in Composition[1] | pH Before Aging | pH After Aging[2] | Ionic Cl⁻ Total After Aging[2] % | ΔCl⁻[3] | Available N+ Consumed % |
|---|---|---|---|---|---|
| Triethylene diamine | 9.10 | 5.84 | 0.32 | 0.13 | 33 |
| Dimethylethanolamine | 9.55 | 8.37 | 0.65 | 0.46 | 58 |
| Tetramethylbutanediamine | 9.64 | 7.99 | 0.68 | 0.49 | 50 |
| Dimethylcyclohexylamine | 9.66 | 7.82 | 0.61 | 0.42 | 75 |
| Triethylamine | 10.18 | 8.95 | 0.62 | 0.43 | 61 |
| Triethylenediamine monoformate | 5.73 | 5.75 | 0.34 | 0.15 | 8 |
| None | 6.34 | 5.80 | 0.21 | 0.02 | — |
| None | 6.33 | 6.30 | 0.19 | — | — |

[1]This is a composition of a chlorinated polyether polyol, having a hydroxyl number of about 300, prepared by condensing 4,4,4-trichloro-1,2-epoxybutane with an equimolar mixture of hexanediol-caprolactone, and dextrose, and 2.0 wt. % catalyst.
[2]Aged at 60° C. for 90 hours.
[3]ΔCl⁻ = Total Cl⁻ after aging - initial Cl⁻ in unaged polyol alone.

PROCESSING CHARACTERISTICS OF STABILIZED AMINE CATALYZED HALOGENATED POLYOL FOAM REACTION FORMULATIONS

TABLE III

| Composition | Parts by Weight | | | | | | |
|---|---|---|---|---|---|---|---|
| Side I | | | | | | | |
| Halogenated Polyol[1] | 100 | 100 | 100 | 100 | 100 | 100 | 100 |
| Supplemental Polyol[2] | 20 | 20 | 20 | 20 | 20 | 20 | 20 |
| Surfactant[3] | 2 | 2 | 2 | 2 | 2 | 2 | 2 |
| Blocked Amine Catalysts[4] | | | | | | | |
| Dimethylethanolamine formate | 3 | 6 | — | — | — | — | — |
| Trimethylbutane diamine monoformate | — | — | 3 | 5 | — | — | — |
| Dimethylcyclohexylamine formate | — | — | — | — | 5 | — | — |
| Trimethylbutane diamine diformate | — | — | — | — | — | 5 | 8 |
| Blowing Agent[5] | 36 | 36 | 36 | 36 | 36 | 36 | 36 |
| Side II | | | | | | | |

TABLE III-continued

| Composition | Parts by Weight | | | | | | |
|---|---|---|---|---|---|---|---|
| Polymethylene polyphenyl-isocyanate⑥ (115 Index) | 117.5 | 117.5 | 117.5 | 117.5 | 117.5 | 117.5 | 117.5 |
| Processing Times | Seconds | | | | | | |
| Cream Time | 40 | 18 | 25 | 14 | 30 | 22 | 12 |
| Gel time | — | 180 | 132 | 72 | 180 | 200 | — |
| Tack-free time | — | — | 220 | 105 | 240 | 240 | — |
| Rise time | — | — | — | 130 | 300 | — | — |

①This is a composition of a chlorinated polyether polyol having a hydroxyl number of about 365, prepared by condensing, in the presence of boron trifluoride etherate, 4,4,4-trichloro-1,2-epoxybutane with an equimolar mixture of ethylene glycol and α-d-glucose monohydrate.
②Copolymer of glycerol and caprolacetone available commercially from Union Carbide under the trademark PCP-0300.
③This is a silicone-glycol copolymer described as Dow Corning® 193 Surfactant in an August, 1968 Dow Corning Bulletin No. 05-146.
④All catalysts were diluted 50/50 with tripropylene glycol; formates were prepared by reacting the amine catalyst with about a stoichiometric amount of formic acid in a propylene glycol solvent medium.
⑤This is a trichlorofluoromethane blowing agent available from DuPont under the trademark "Freon 11B".
⑥This is a polymethylene polyphenylisocyanate having a functionality of 2.6, available commercially from Upjohn Company under the trademark "PAPI".

What is claimed is:

1. A catalytically storage-stable halogenated polyol pre-mix formulation comprising
    a halogenated polyether polyol and about 0.02 to about 5 percent by weight based on the halogenated polyol of an acid-blocked amine polyurethane foaming catalyst, said catalyst prepared by reacting a carboxylic acid with an alkyl tertiary amine.

2. The composition of claim 1 wherein said polyol is a polyether polyol which is the product of condensing a polyhydroxy compound having from 2–8 hydroxy groups with a halogenated alkylene oxide.

3. The composition of claim 2 wherein said polyhydroxy compound is a dextrose-based material or a sucrose-based material and said polyol has a hydroxyl number of about 250–650.

4. The composition of claim 3 wherein said halogenated alkylene oxide contains 3–4 carbon atoms and at least 2 halogens in the molecule.

5. The composition of claim 4 wherein said halogenated alkylene oxide is 4,4,4-trichloro-1,2-epoxybutane.

6. The composition of claim 5 wherein said caboxylic acid is formic acid.

7. The composition of claim 6 wherein said polyhydroxy compound is a dextrose-based material.

8. The composition of claim 7 wherein said dextrose-based material is a mixture of dextrose and an aliphatic diol or an aliphatic triol.

9. The composition of claim 8 wherein said dextrose-based material is a mixture of dextrose with ethylene glycol, propylene glycol, glycerol, trimethylolpropane, or a mixture thereof.

10. The composition of claim 9 wherein said halogenated polyol is prepared by condensing, in the presence of boron trifluoride or an etherate derivative thereof, said 4,4,4-trichloro-1,2-epoxybutane with a mixture of about 1 mole of d-glucose monohydrate per mole of said ethylene glycol.

11. The composition of claim 10 wherein said alkyl tertiary amine contains 3–10 carbon atoms and is selected from the group consisting of a trialkylmonoamine, a trialkylene diamine, a N,N,N',N'-tetraalkyl alkylene diamine, a dialkylcyclohexylamine, a dialkyl alkanolamine, an alkyl dialkanolamine, and a trialkanolamine.

12. The composition of claim 11 wherein said trialkylmonoamine is trimethylene or triethylamine, said trialkylene diamine is triethylene diamine, said N,N,N',N'-tetraalkyl alkylene diamine is tetramethyl butylene diamine, said dialkylcyclohexylamine is dimethylcyclohexylamine or diethylcyclohexylamine, said dialkyl alkanolamine is dimethylethanolamine or dimethylpropanolamine, said alkyl dialkanolamine is methyl diethanolamine or methyl dipropanolamine, and said trialkanolamine is trimethanolamine, diethanolpropanolamine, triethanolamine or tripropanolamine.

13. The composition of claim 12 wherein said alkyl tertiary amine is selected from the group consisting of triethylene diamine, dimethylcyclohexylamine, N,N,N',N'-tetramethylbutylene diamine, triethanolamine, dimethylethanolamine, and mixtures therof.

14. The composition of claim 13 wherein said catalyst is prepared by reacting a carboxylic acid with an alkyl tertiary amine in a molar ratio of acid to amine of about 1:1 to about 1.5:1.

15. A process for preparing a catalytically storage-stable halogenated polyol pre-mix formulation, containing a halogenated polyether polyol and an amine polyurethane foam catalyst, comprising mixing an acid-blocked amine catalyst with said halogenated polyether polyol, in a proportion from about 0.02 to about 5 percent by weight of said acid-blocked amine catalyst based on the weight of the halogenated polyol, said acid-blocked amine catalyst prepared by reacting a carboxylic acid with an alkyl tertiary amine catalyst.

* * * * *